Patented Jan. 12, 1932

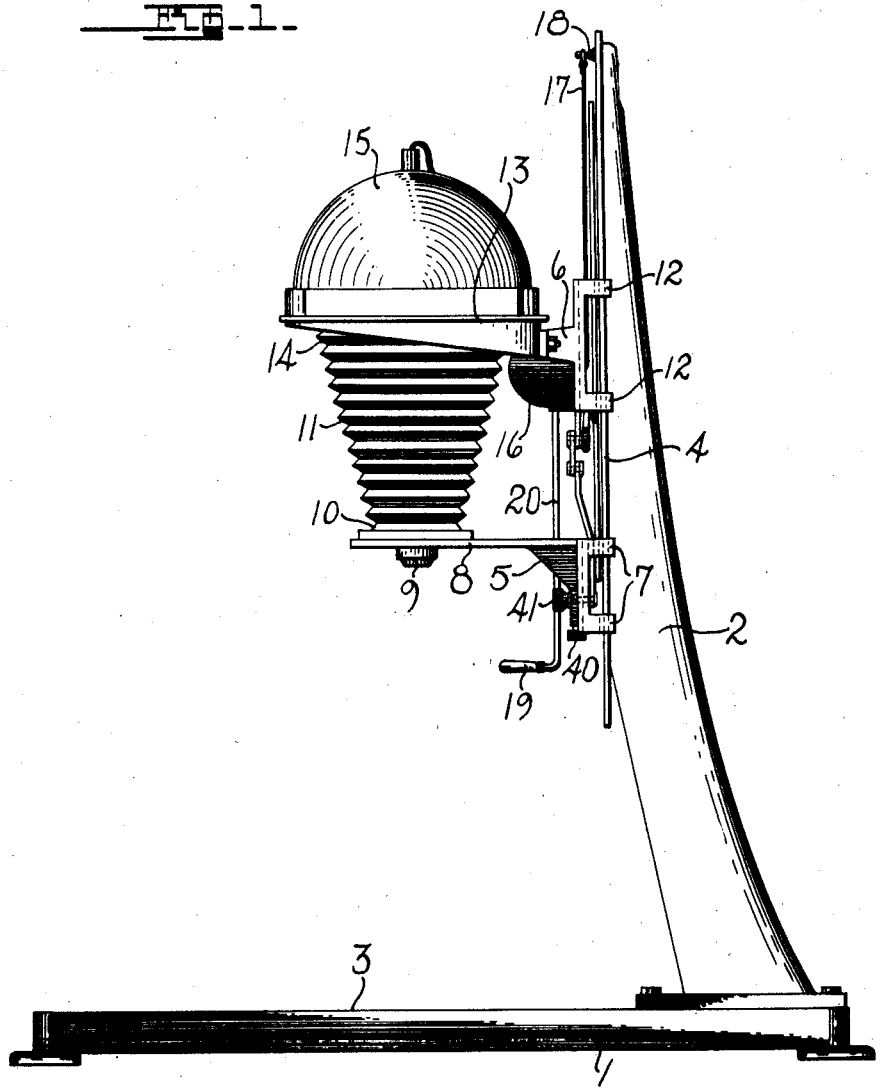

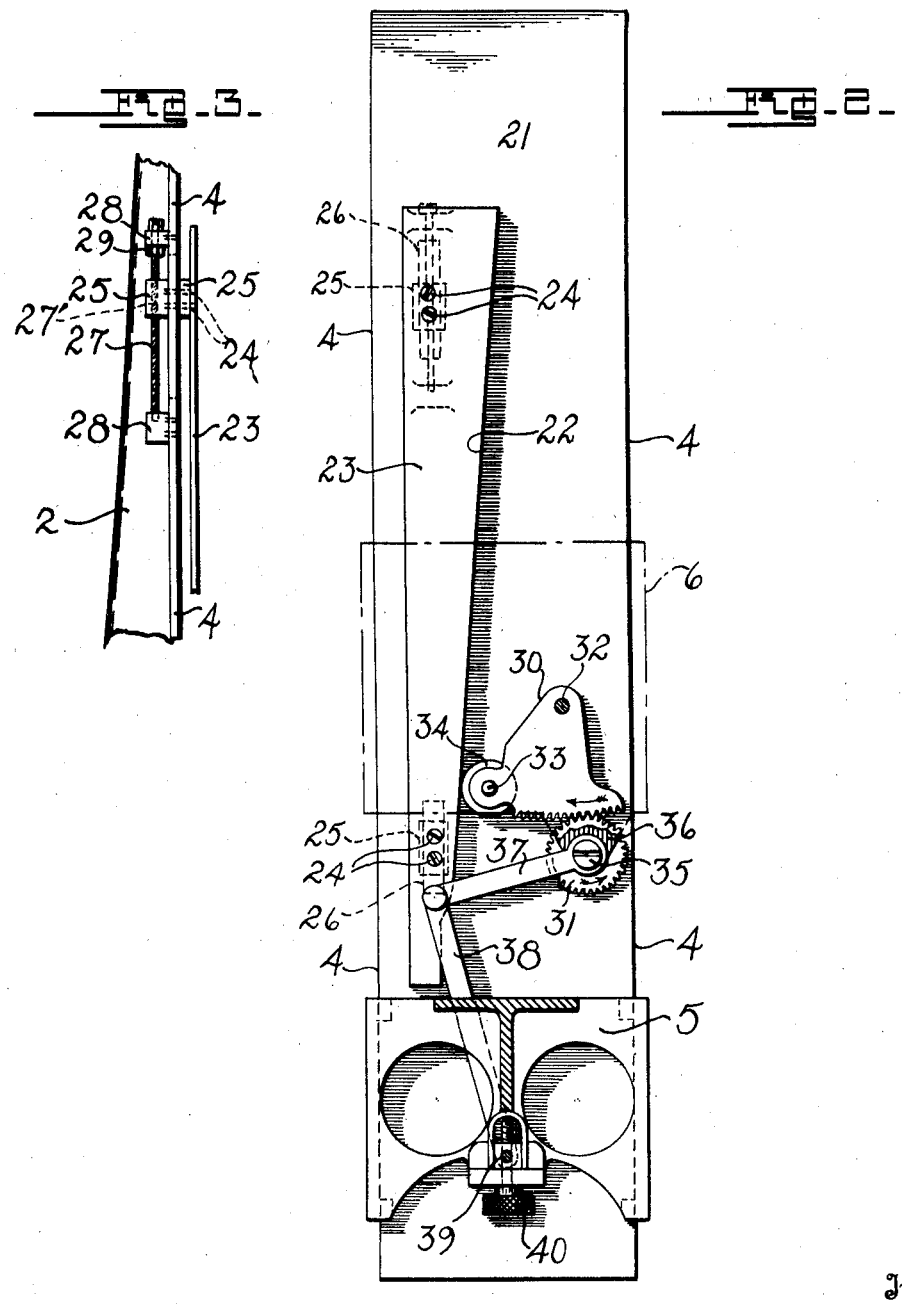

1,840,468

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

AUTOMATICALLY FOCUSING ENLARGING CAMERA

Application filed October 22, 1929. Serial No. 401,525.

This invention relates to photography and more particularly to photographic enlarging cameras. One object of my invention is to provide an enlarger which includes mechanism for keeping the machine in focus throughout its range of movement without attention from an operator. Another object of my invention is to provide a machine of the type described consisting of a few comparatively simple parts. Other objects will appear from the following specification, the novel features being particularly pointed out in the claims at the end thereof.

Coming now to the drawings wherein like reference characters denote like parts throughout:—

Fig. 1 is a side elevation of an enlarging machine constructed in accordance with and embodying a preferred form of my invention;

Fig. 2 is an enlarged front elevation parallel in section showing the means for automatically keeping the parts in focus, and Fig. 3 is an enlarged sectional detail showing the mechanism for adjusting the cam.

As indicated in Fig. 1, my preferred type of enlarger consists of a base member 1 upon which there is fastened an upright support 2. This support is preferably arranged on one side of the base 1 so that there remains an area 3 on which a paper holder may be positioned.

The rigid support 2 is provided with a track 4 on which two slides 5 and 6 are mounted one above the other. Slide 5 is provided with grooved runners 7 adapted to slide on the track 4 and is further provided with a lens board 8 which preferably carries an objective 9 and one end 10 of a camera bellows 11.

Slide 6 also moves on a track 4 through contact of the spaced runners 12 with the track. This slide supports a frame 13 which carries the upper end 14 of the bellows 11 and a lamphouse 15 which may be of any preferred type.

In order to facilitate easy movement of the slide 6, there is a counter balance formed by a spring roller enclosed in the housing 16, this spring roller being connected by means of a flat strip 17 to a stud 18 carried by the rigid support 2. The handle 19 is provided on the end of a shaft 20 for moving slide 6 and a suitable lock may be arranged to hold the parts in a set position.

So far, the parts may be of known construction.

Referring to Fig. 2, the tracks 4 are the edges of a flat plate 21 which is attached fixedly to a rigid support 2. This plate carries a cam surface 22 which can be conveniently made from a plate 23 which may be fastened by screws 24 to runners 25 which may slide in the cut-out apertures 26 in the plate 21.

As best shown in Fig. 3, one of the runners 25 may extend rearwardly and may be threaded at 27' to receive a screw 27 passing through a pair of lugs 28 carried by the rigid support 2.

By turning the screw 28, the cam 23 may be moved vertically and may be set by turning the locknut 29 against the lug 28.

The cam surface 22 controls the relative position between the slides 5 and 6 through the following mechanism. The upper slide 5 carries a pair of gears 30 and 31. Since gear 30 need turn only through a small angle, a gear segment such as shown in Fig. 2 may be used if desired. Gear 30 is pivoted upon a post 32 which is connected to the slide 6 and this gear carries a stud 33 which supports a roller 34 adapted to contact with the cam surface 22. Gear 31 is pivoted upon a stub shaft 35 supported in arms 36 extending downwardly from slide 6.

Gear 31 is connected by an arm 37 and a link 38 to a pin 39 which may be adjustably mounted by means of set screws 40 and 41 carried by the slide 5.

The weight of the lower slide 5 is supported by the link 38 and arm 37 and consequently there is a tendency to turn gear 31 in the direction shown by the arrow. This turning movement is transmitted to gear 30 so that the roller 34 is constantly held in contact with the cam surface 22.

In adjusting the focusing machine the hande 19 is used to raise or lower slide 6. This movement causes the roller to turn on the cam surface 22 and rock the gear 30 so that it in turn will turn gear 31. Through arm 37 and link 38 the slide 5 will be moved and there will always be a predetermined relation between slides 5 and 6 through the action of the roller 34 and the cam surface 22.

While the structure shown in the drawings is normally suitable for a single focal length lens. It is a well known fact that high grade objectives intended to be of the same focal length are frequently of somewhat different focal lengths. To care for this variation, only two adjustments are necessary. If the variation is only a slight one, the position of pin 39 with respect to slide 5 can be usually altered a sufficient distance to bring the lens into proper focus. If, on the other hand, there is a considerable variation from the standard focal length, the cam surface 22 may be slid upon its support by adjusting screw 27 and if the lens is properly adjusted, the nut 25 may be tightened down to hold the parts in a set position.

Having thus described my invention, what I claim as new and desire to secure to Letters Patent is:

1. Photographic apparatus comprising a rigid support having a cam surface, tracks, and a pair of slides movable thereon, one carrying an objective and the other carrying a negative carrier, means for differentially moving the slides relative to the support including a pair of gears, one gear carrying a roller adapted to contact with the cam, and the other gear being adapted to transmit movement to a slide from the cam.

2. Photographic apparatus comprising a rigid support having a cam surface, tracks and a pair of slides movable thereon, one carrying an objective and the other carrying a negative carrier, means for differentially moving the slides relative to the support including a pair of gears carried by one slide, one gear supporting a roller adapted to contact with the cam, the other gear meshing with the first gear, connections between the second gear and the other slide adapted to permit movement of the second slide in a predetermined constant relation to the movement of the first slide.

3. Photographic apparatus comprising a rigid support having a cam surface, a pair of slides, one carrying an objective and the other carrying a negative holder means for controlling the relative movement of the slides by the cam including a cam contacting roller, a gear segment for supporting said roller and adapted to be moved thereby, a gear meshing with the gear segment, and an arm and link connected to the gear and the other slide for transmitting movement from one side to the other.

4. Photographic apparatus comprising a rigid support, having a cam surface, a pair of slides, one carrying an objective and the other carrying a negative holder means for controlling the relative movement of the slides by the cam including a cam contacting roller, a cam follower, a gear segment carried by a slide, a stud on said gear segment supporting said cam follower, a gear pivoted to said slide and meshing with said gear segment, an arm attached to turn with the gear, a link connecting the arm to the second mentioned slide, whereby movement of the first slide may be transmitted to the second slide.

5. Photographic apparatus comprising a rigid support, a cam adjustably mounted thereon, a track, and slides movably mounted on the track, one above the other, one carrying an objective and the other carrying a negative holder, mechanism for moving the upper slide, connections between the upper and lower slides for controlling the movement of the latter by the former including a pair of intermeshing gears, a cam follower carried by one gear, the other gear being connected to the lower slide whereby movement of the upper slide may transmit movement to the lower slide and a predetermined relation may be maintained between the slides and support.

6. Photographic apparatus comprising a rigid support, a cam adjustably mounted thereon, a track, and slides movably mounted on the track, one above the other, one carrying an objective and the other carrying a negative holder, mechanism for moving the upper slide, connections between the upper and lower slides for controlling the movement of the latter by the former including a pair of intermeshing gears, means for controlling the movement of one gear through the cam, mechanism for connecting the other gear to the lower slide whereby movement of the lower slide is controlled by the movement of the upper slide through the cam and a predetermined relation is maintained.

7. Photographic apparatus comprising a rigid support, a cam adjustably mounted thereon, a track, and slides movably mounted on the track, one above the other, one carrying an objective and the other carrying a negative holder, mechanism for moving the upper slide, connections between the upper and lower slides for controlling the movement of the latter by the former including a pair of intermeshing gears, one gear carrying an arm, said arm being pivotally connected to the lower slide whereby the weight of the lower slide tends to turn said gear, a roller carried by the other gear adapted to contact with said cam surface, said cam and roller being forced into contact through the force transmitted to the roller carrying gear by the first mentioned gear.

Signed at Rochester, New York, this 18th day of October, 1929.

WILLIAM A. RIDDELL.